United States Patent
Cuckson et al.

(10) Patent No.: US 7,395,276 B2
(45) Date of Patent: *Jul. 1, 2008

(54) SYSTEMS AND METHODS FOR RESOLVING TELEPHONE NUMBER DISCREPANCIES EN MASSE

(75) Inventors: Lee T. Cuckson, Highlands Ranch, CO (US); Chad Swierczek, Highlands Ranch, CO (US)

(73) Assignee: Qwest Communications International Inc., Denver, CO (US)

( * ) Notice: Subject to any disclaimer, the term of this patent is extended or adjusted under 35 U.S.C. 154(b) by 336 days.

This patent is subject to a terminal disclaimer.

(21) Appl. No.: 10/404,761

(22) Filed: Mar. 31, 2003

(65) Prior Publication Data

US 2004/0193645 A1   Sep. 30, 2004

(51) Int. Cl.
*G06F 7/00* (2006.01)
(52) U.S. Cl. .................. 707/104.1; 707/102; 705/1; 705/22; 379/221.13
(58) Field of Classification Search ............. 707/104.1, 707/102; 705/1, 22; 375/221.13; 379/221.13
See application file for complete search history.

(56) References Cited

U.S. PATENT DOCUMENTS

| | | | | |
|---|---|---|---|---|
| 5,684,990 A | * | 11/1997 | Boothby | 707/203 |
| 5,689,705 A | * | 11/1997 | Fino et al. | 707/201 |
| 5,717,748 A | * | 2/1998 | Sneed et al. | 379/221.09 |
| H1743 H | * | 8/1998 | Graves et al. | 700/236 |
| 5,883,948 A | * | 3/1999 | Dunn | 379/221.09 |
| 5,910,981 A | * | 6/1999 | Bhagat et al. | 379/219 |
| 6,073,140 A | * | 6/2000 | Morgan et al. | 707/203 |
| 6,256,624 B1 | | 7/2001 | Pollard et al. | |
| 6,298,352 B1 | | 10/2001 | Kannan et al. | |
| 2003/0067926 A1 | * | 4/2003 | Golikeri et al. | 370/401 |
| 2003/0074372 A1 | | 4/2003 | Barchi et al. | |
| 2003/0084074 A1 | * | 5/2003 | Balogh et al. | 707/201 |

FOREIGN PATENT DOCUMENTS

EP    1 098 500 A2 *  2/2000

* cited by examiner

*Primary Examiner*—Wilson Lee
*Assistant Examiner*—Michael Le
(74) *Attorney, Agent, or Firm*—Townsend and Townsend and Crew LLP (57) ABSTRACT

A method of correcting telephone number status discrepancies using a telephone number inventory management system includes providing a telephone number inventory management system. In the system, each telephone number in a group of telephone numbers is represented by an active data record. The active data records comprise include data representing the telephone number and data representing a rule relating to the telephone number. Each rule represents a unique combination of actual states for telephone numbers among a number of data environments. The method also includes identifying a specific rule that reflects a discrepancy among the plurality of data environments, searching the active data records for telephone numbers relating to the specific rule, and transmitting from the telephone number inventory management system a command to one of the plurality of data environments to change the status of each of the telephone numbers relating to the specific rule.

24 Claims, 8 Drawing Sheets

Report Viewer

Back | Forward | Stop | Refresh | Home | Search | Favorites | History | Mail | Print | Edit Preview ▶ | ↑ = ⚡ | ▶ | of 2 | ▲ ▼ ▲

Top | AZ | 480

Data current on: October 07, 2002

MTE Legend: ☐ 0 to 4 months ☐ 4 to 6 months ☐ 6 to 18 months ☐ more than 18 months

| | | | | | FCC Data | | | | | 1K Blocks | | |
|---|---|---|---|---|---|---|---|---|---|---|---|---|
| Rate Center | State | NE CLLI | MTE | AMG | Assigned | +/- | Available | +/- | % Util | NXXs | Received | Donated |
| ☐RIVERDALE | AB | QOEDAB79DS0 | 0.0 | 18.0 | 320 | 7 | 0 | 0 | 90.9% | 6 | 0 | 0 |
| ☐RIVERDALE | AB | PERDABMADS0 | >120.0 | (368.0) | 137,772 | (104) | 18,445 | 124 | 81.0% | 17 | 0 | 0 |
| ☐RIVERDALE | AB | DSEDABSODS0 | 35.4 | 63.0 | 25,748 | 36 | 2,232 | (39) | 85.8% | 3 | 0 | 0 |
| ☐RIVERDALE | AB | MEDDABWEDS0 | >120.0 | (80.8) | 118,017 | 27 | 21,947 | (12) | 78.7% | 15 | 1 | 1 |
| ☐RIVERDALE | AB | YHSKABMADS0 | >120.0 | (1.3) | 27,417 | 18 | 9,341 | (20) | 70.3% | 4 | 0 | 0 |
| ☐RIVERDALE | AB | LMLDABMADS0 | >120.0 | (47.2) | 21,905 | (85) | 5,664 | 2 | 73.0% | 3 | 0 | 3 |
| ☐RIVERDALE | AB | SPQDABNORS1 | >120.0 | 10.0 | 2,844 | 14 | 3,920 | (6) | 40.6% | 1 | 0 | 0 |
| ☐RIVERDALE | AB | KSGYABMADS1 | 2.7 | 610.3 | 16,255 | 15 | 1,627 | (7) | 81.3% | 2 | 0 | 1 |
| ☐RIVERDALE | AB | KTRYABQCDS2 | >120.0 | 106.3 | 12,545 | 34 | 14,556 | 31 | 43.3% | 3 | 0 | 3 |
| ☐RIVERDALE | AB | ZNRAABGIDS0 | >120.0 | (344.2) | 84,782 | (117) | 19,560 | 107 | 72.4% | 12 | 0 | 2 |
| ☐RIVERDALE | AB | HNPAABMADS0 | >120.0 | (771.0) | 153,851 | (203) | 36,485 | 115 | 74.0% | 21 | 0 | 0 |
| ☐RIVERDALE | AB | SPWAAB04DS0 | 0.0 | 48.3 | 316 | 11 | 0 | 0 | 95.2% | 1 | 0 | 0 |
| ☐RIVERDALE | AB | BSSAAB55DS0 | 0.0 | 6.8 | 50 | 1 | 0 | 0 | 100.0% | 1 | 0 | 0 |
| ☐RIVERDALE | AB | PSUXAB12DS0 | >120.0 | 19.2 | 235 | (100) | 0 | (4) | 70.1% | 5 | 0 | 0 |
| ☐RIVERDALE | AB | TEYXAB19DS1 | 0.0 | 0.5 | 13 | 0 | 0 | 0 | 43.3% | 2 | 0 | 0 |
| ☐RIVERDALE | AB | MYYXAB28DS2 | 0.0 | 2.7 | 18 | 0 | 0 | 0 | 90.0% | 1 | 0 | 0 |
| ☐RIVERDALE | AB | SGKXAB81DS0 | >120.0 | (43.5) | 9,552 | (4) | 4,994 | (6) | 59.7% | 2 | 0 | 4 |
| ☐RIVERDALE | AB | QJSXABPPDS0 | >120.0 | (113.2) | 17,732 | (25) | 7,864 | 7 | 63.3% | 3 | 0 | 2 |
| ☐RIVERDALE | AB | XZZYABUXDS0 | >120.0 | (86.3) | 691 | 400 | 0 | 0 | 76.8% | 13 | 0 | 0 |
| ☐RIVERDALE | AB | BRRYABXTDS0 | 0.0 | 0.0 | 3 | 0 | 0 | 0 | 100.0% | 1 | 0 | 0 |
| ☐RIVERDALE | AB | UEJZAB87DS0 | 0.0 | 0.3 | 7 | 0 | 0 | 0 | 100.0% | 2 | 0 | 0 |
| ☐RIVERDALE | AB | AZAZABDNDS1 | >120.0 | 0.0 | 114 | 0 | 0 | 0 | 99.1% | 2 | 0 | 0 |
| ☐RIVERDALE | AB | BNYYABPPDS0 | 3.8 | 730.0 | 78,800 | 130 | 2,749 | (148) | 87.6% | 9 | 0 | 0 |

TNVU- MTE Number Planning

SYSTEMS AND METHODS FOR RESOLVING TELEPHONE NUMBER DISCREPANCIES EN MASSE

CROSS-REFERENCES TO RELATED APPLICATIONS

This application is related to co-pending, commonly assigned, and concurrently filed U.S. patent application Ser. No. 10/404,819, filed on Mar. 31, 2005, entitled "SYSTEMS AND METHODS FOR MANAGING TELEPHONE NUMBER INVENTORY", and to co-pending, commonly assigned, and concurrently filed U.S. patent application Ser. No. 10/404,767, filed on Mar. 31, 2005, entitled "SYSTEMS AND METHODS FOR MANAGING LARGE DATA ENVIRONMENTS", and to co-pending, commonly assigned, and concurrently filed U.S. patent application Ser. No. 10/404,817, filed on Mar. 31, 2005, entitled "SYSTEMS AND METHODS FOR RESTRICTING A TELEPHONE NUMBER'S AVAILABILITY FOR ASSIGNMENT", and to 10/404,761, filed on Mar. 31, 2005, entitled "SYSTEMS AND METHODS FOR CLEARING TELEPHONE NUMBER PORTING ASSIGNMENTS EN MASSE", which applications are incorporated herein by reference in their entirety for all purposes.

BACKGROUND OF THE INVENTION

The present invention relates generally to data management systems. More specifically, the present invention relates to systems and methods for storing, manipulating, and accessing data in data management systems.

In many business environments, data management systems have evolved along with the business. As new needs for maintaining data arise, the business typically modifies existing systems to satisfy the new need. It is common, however, for a need to arise that overwhelms the capacity of existing systems or taxes its original design scope of operation. This may occur for many reasons. For example, operational support systems are not typically designed for data reporting, yet new requirements may depend on reporting on the data such systems maintain. Further, the need for data reporting may require information from different systems in which the needed information is maintained differently. Further still, historical reporting may be needed from systems not designed to maintain historical data. In such cases, the effort to efficiently access the data for the reports may require modifications beyond the capability of the present systems. As another example, it may be the case that the sheer volume of data stored in diverse systems makes efficiently accessing the data difficult. Data queries may require too much time to process, rendering the systems unacceptable for new tasks. In yet another example, it may be impossible to obtain accurate data in multiple dynamic systems because the information may change before the necessary information is obtained from each of the systems. In other words, the data in the various systems may not be point-in-time synchronized. For these reasons, new methods of accessing data from different systems are needed. Further, new methods of working with the data are needed.

BRIEF SUMMARY OF THE INVENTION

Embodiments of the present invention thus provide a method of correcting telephone number status discrepancies using a telephone number inventory management system. The method includes providing a telephone number inventory management system. In the system, each telephone number in a plurality of telephone numbers is represented by an active data record. The active data records include data representing the telephone number and data representing a rule relating to the telephone number. The rule relating to the telephone number is selected from a list of rules. Each rule represents a unique combination of actual states for telephone numbers among a plurality of data environments. The method also includes identifying a specific rule that reflects a discrepancy among the plurality of data environments, searching the active data records for telephone numbers relating to the specific rule, and transmitting from the telephone number inventory management system a command to one of the plurality of data environments to change the status of each of the telephone numbers relating to the specific rule. In some embodiments, one of the data environments relates to a telephone number inventory system, which may be a Customer Number Manager product. One of the data environments may relate to a telephone number porting management system, which may be an Advanced Service Management System. One of the data environments may relate to a service order system. One of the data environments may relate to a system that manages data relating to central office facilities and circuits.

In other embodiments, a system for correcting telephone number status discrepancies includes a host computer system. The host computer system is programmed to manage data relating to telephone numbers. Each telephone number in a plurality of telephone numbers is represented by an active data record. The active data records include data representing the telephone number and data representing a rule relating to the telephone number. The rule relating to the telephone number is selected from a list of rules. Each of which rules represents a unique combination of actual states for telephone numbers among a plurality of data environments. The host computer system is further programmed to receive information identifying a specific rule that reflects a discrepancy among the plurality of data environments, search the active data records for telephone numbers relating to the specific rule, and transmit a command to one of the plurality of data environments to change the status of each of the telephone numbers relating to the specific rule.

In still other embodiments, a telephone number inventory management system includes a host computer system that is programmed to manage data relating to telephone numbers. Each telephone number in a plurality of telephone numbers is represented by an active data record. The active data records includes data representing the telephone number and data representing a rule relating to the telephone number. The rule relating to the telephone number is selected from a list of rules. Each rule represents a unique combination of actual states for telephone numbers among a plurality of data environments. The host computer system also includes receiving means for receiving information identifying a specific rule that reflects a discrepancy among the plurality of data environments, searching means for searching the active data records for telephone numbers relating to the specific rule, and transmitting means for transmitting a command to one of the plurality of data environments to change the status of each of the telephone numbers relating to the specific rule.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 5A and 5B illustrate embodiments of an interactive user interface for reporting to a user information relating to data maintained according to embodiments of the present invention.

DETAILED DESCRIPTION OF THE INVENTION

According to the present invention, it becomes possible to efficiently access data that is maintained across multiple data environments. The data may be maintained differently in each of the data environments. The data also may be dynamic. The present invention is particularly useful in data management systems having very large volumes of data, for example, census data systems, telephone number inventory management systems, and the like.

In general, according to the present invention, the process begins by identifying information of interest relating to stored data items. According to a non-limiting example of the present invention, the data items are telephone numbers (TNs) and the information of interest is the status of each TN. A data environment is a system of one or more computing devices and/or data storage devices. Several examples of data environments will be described in more detail hereinafter. Although a TN management system will be used herein as a specific example to which the teachings of the present invention may be applied, the present invention is in no way limited to TN management systems. The teachings of the present invention may be applied to many other types of systems.

TN inventory management is a critical function of many telephone service providers. TNs are a finite resource, and their use and availability are regulated by the Federal Communications Commission (FCC). As the telephone network has evolved over the years, the systems that operate the network have been designed to operate according to specific standards. For example, the present standard provides for seven digit dialing to reach customers within most local telephone areas, and ten digit dialing to reach other customers, at least within the national telephone network (i.e., the public switched telephone network, PSTN). As such, TNs are ten digit numbers. The ten digits are segmented into a number plan area (NPA), typically representing a geographic area, an exchange (NXX) representing a central office, and a four digit "line." Thus, any U.S. TN's format may be expressed as NPA-NXX-LINE.

The North American Numbering Plan Administrator (NANPA) is the organization that releases TNs to telephone service providers. NANPA heretofore has released TNs in blocks of 10,000. Because TNs may be exhausted at the current rate of release by NANPA to telephone service providers, the FCC has implemented several initiatives to ensure a continuous TN supply. One such initiative may ultimately add additional digits to each TN. Because of the numerous changes to present telephone networks needed to accommodate the additional digits, this initiative would take many years to implement. Some sources opine that implementing this initiative would dwarf the Y2K initiative in complexity. A second initiative is the Numbering Resource Optimization (NRO) order 00-104 (hereinafter "the number pooling mandate"). The number pooling mandate requires TN management in blocks of 1,000, and imposes reporting requirements on telephone service providers detailing the service provider's inventory in terms of TN status. These reports will facilitate the donation of TNs in blocks of 1,000 to a TN pool so that the TNs may be allocated to other service providers. In this way, the FCC hopes to prolong the usage of ten-digit TNs by minimizing "wasted" TNs.

Unfortunately, the number pooling mandate requires reporting of status information according to FCC-defined categories that, in most cases, do not relate to categories used by telephone service providers. Thus, present TN inventory management systems cannot easily generate the reports needed to satisfy the number pooling mandate. Further, information from other data environments that may affect a TN's status vis-a-vis the FCC-mandated categories must be included to produce accurate reports.

Continuing with the example of a TN management system, the "status" of a TN refers to a TN's present state of usage. For example, a TN may be assigned to a residential customer or a business customer; it may be configured for voice communication or data communication; it may be reserved for a future, specific customer; it may be "ported" from an original switch through a number of intermediate switches to a destination switch; it may be the subject of a pending service order; it may also be available for assignment to a customer. Many other examples are possible. According to the present invention, many different data environments may maintain data relating to any particular TN's status, some of which do not include a "status" variable. In such systems, the status must be derived from other information. In this example, however, the number of different possibilities for a TN's status is finite in each of the data environments, even though the possibilities may be different in each of the environments.

Continuing with this example, data is loaded from each of several data environments into a common data management system. It is not necessary to load all the data stored in each of the data environments; the data loaded from the data environments may be limited to the data needed in further operations. It may be necessary at this point, however, to map data from one or more of the data environments into a consistent format. Further, it may be necessary to derive values for certain variables from data maintained in one or more of the data environments. In other words, the process of loading data from the data environments into the data management system may involve some data manipulation. For example, for some data environments it may be necessary to derive each TN's status from other data maintained by the data environment if that data environment has no concept of status.

The data from the data environments are loaded into records, each record representing the data applicable to a TN in a data environment. Thus, each TN may have more than one record. The records into which data is loaded may include a start field that identifies the earliest point in time for which the data applies to the TN of the record. Each record also may include an end field that identifies the latest point in time to which the data applies to the TN of the record. The end field may be empty when the record is first created. As will be explained further below, the end field may be written with a date when data applicable to a given TN changes. Thus, records may be considered "open" until the end field is filled, after which the record is closed. In this way open records for a TN identify a TN's present status, while closed records identify a TN's historical status. The records are then saved for future uses.

Future uses for records may include: reports relating to the status of all TNs in the system; a query relating to the status of a specific TN in a specific system; a query relating to TNs that have changed status in a given period of time; and the like. Many other examples are possible, some of which will be explained in more detail hereinafter.

Periodically, the records may be updated to reflect changes to each TN's data. This is accomplished by comparing each TN's data in each data environment to the TN's data in the open records. Alternatively or additionally, this may be accomplished by reading the data from the data environments into the common data management system and comparing the new data to the data read previously. A report of changes may then be used to update the records. Other possibilities for updating the records exist, and different update processes may be applied to each data environment.

As explained previously, when data relating to an item changes, the record may be closed by writing in the end field the last date for which the previous data applied to the item and opening a new record reflecting the new data, including a new beginning date in the start field. The new and modified records are then saved for future use as explained above. The updating process, which opens new records and closes old records, is particularly useful in that it provides a compact and efficient process for maintaining historical data relating to each item. It is often the case that the data environments, often burdened with the task of maintaining large volumes of additional data, do not maintain historical data. Thus, in addition to solving the problem of relating data across many different systems, the present invention provides historical reporting capabilities.

It should be noted that the order of opening, closing, and saving records is not limited to that described above. Records may be saved at any time in relation to the process of opening and closing them and comparing the information relating to other records. In light of the disclosure herein, those skilled in the art will realize many different approaches to carrying out the specific tasks outlined above.

With respect to the present example relating to TNs, the records may include name and address information relating to the current customer to which a TN is assigned. It is also possible to maintain other information in the records so that queries on the records may be accomplished efficiently. For example, the present switch to which a TN is assigned may be maintained in the record for a TN. It is also possible, however, to construct queries that obtain information from the stored records and then extract additional information from one or more of the data environments. Those skilled in the art will realize many additional possibilities for manipulating data and extracting information from the data management system in light of the disclosure herein. Thus, the present invention is not limited to the specific examples described herein.

The present invention also provides a process for updating status information from the data management system to one or more of the data environments. This synchronizing process, which will be described in more detail hereinafter, may become necessary because one or more of the data environments do not maintain complete and/or accurate information on all items (e.g., TNs). Thus, during the record updating process, the data environment may no longer provide information on an item on which it previously reported. However, the record may remain open in the data management system. Thus, occasional correction of "data drift" may be necessary or desirable.

According to the present invention, rules may be used to further streamline the process of obtaining information from the data management system. For example, a set of rules may be established, each rule being a key that represents a TN's status in each of the data environments. Because a TN has a finite number of possibilities for its status in each data environment, it is possible to establish a complete set of rules that identify all possible status combinations across all data environments. For example, if TNs have three status possibilities in one data environment, four in a second data environment, and two in a third data environment, twenty-four rules (3×4× 2=24) will describe the combined status of all TNs across the three data environments.

Although the number of possibilities for a TN's status in each system is finite, the number of possibilities may change. For example, if a third possibility is added for the status of a TN in the third data environment, then twelve additional rules may be added to allow for the additional possibilities for each TN's overall status. Likewise, if a new data environment is added, new rules may be added to account for the additional possibilities for a TN's status in the additional system. Thus, the present invention is not limited to an initial, fixed number of rules.

Once the rules are established, records may be created that include each TN and the rule that defines the TN's status across all data environments. Thus, whereas the data management system previously included multiple records for each TN, as many as one per data environment, the rules-based records condense the status information into a single record for each TN.

According to the present invention, the information of interest may change to adapt to new requirements. As will be described in more detail hereinafter, the present invention includes a rules-load process wherein rules that relate to the new information of interest are loaded. Thus, the present invention is dynamic with respect to changing needs. Further, additional rules sets relating to other information of interest may be loaded, thus adding additional dimensions to the data management process.

The present invention provides additional desirable features. For example, the creation of rules relating to the information of interest allows management of the items at the rule level, rather than the item level. In the case of TNs, if a particular rule reflects an overall status across the several data environments known to create conflicts, an occurrence of the rule may generate a flag signaling a potential problem that may be worked prior to the occurrence of the conflict. A specific example of this would be a TN that is identified as "assigned" to a customer in one data environment but that is listed as "available" in another data environment. Rules that reflect conflicts also may be assigned a specific person or organization of responsibility. This responsible party may receive a message alerting it to the presence of a potential problem. In still a further extension of this capability, the item to which the rule applies may be blocked or otherwise protected automatically, pending resolution, such that the potential problem is avoided. These and many other features and benefits of the present invention will be explained in more detail hereinafter.

Figure 1A:
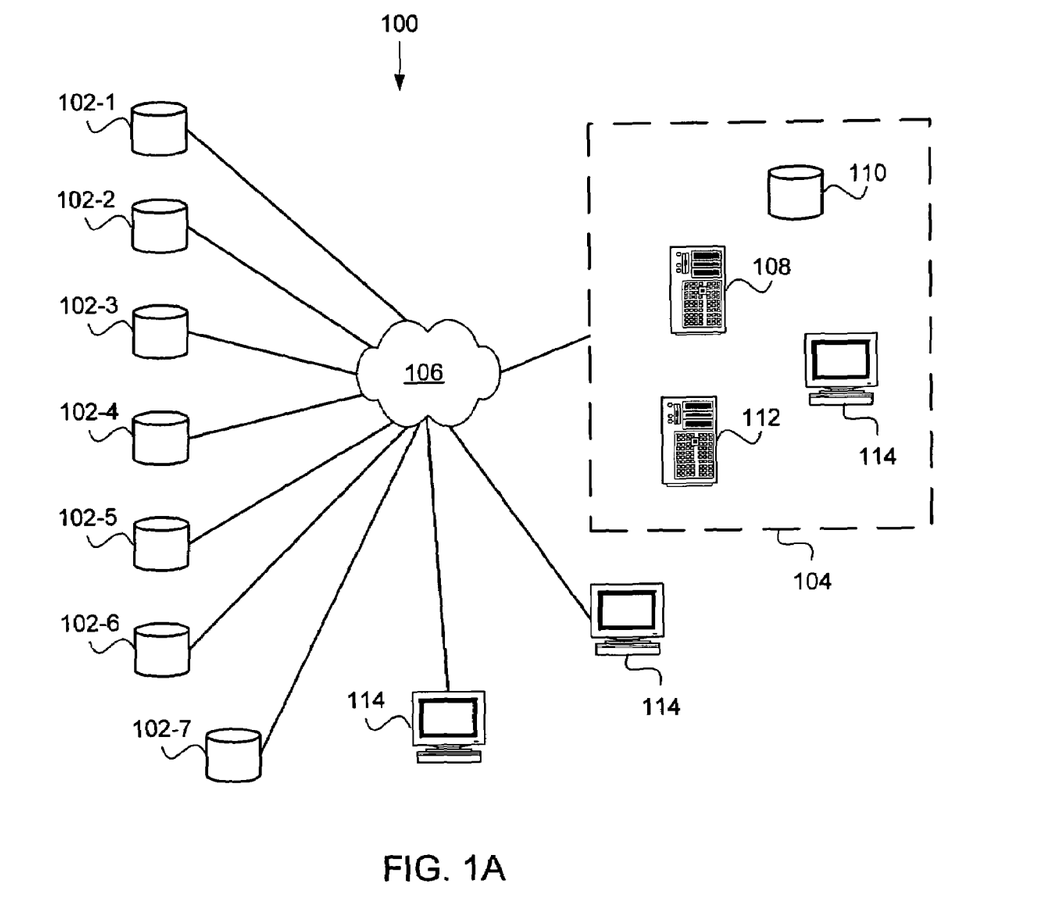
FIGS. 1A, 1B, and 1C illustrate, respectfully, a data management system, an active record data table format, and a rule list format, according to embodiments of the present invention.

Having described the present invention generally, attention is directed to FIG. 1A, which illustrates a specific example of a data management system 100 according to an embodiment of the present invention. The system 100 relates to a TN management system. As stated previously, although a TN management system is used for illustrative purposes to demonstrate the elements, features, and benefits of the present invention, the present invention is in no way limited to a TN management system. The system 100 includes a plurality of data environments 102, and a host computer system 104. Each of the plurality of data environments 102 communicates with the host computer system through a network 106. The data environments 102 may comprise a database, a computing device, one or more terminals for accessing data maintained in the data environment, other computer peripherals, and/or the like. Specific examples of the data environments 102 will be provided hereinafter.

The host computer system 104 may be any computing device or computing system. For example, the host computer system 104 may include a server computer 108, a database server 110, a web server 112, and/or the like. The various components of the host computer system may be co-located at a single geographic area or may be distributed throughout many different geographic locations, as is known in the art. In fact, the host computer system 104 and the data environments 102 may be distributed throughout a number of different geographic areas or co-located at a single location. In some embodiments, the various data environments 102 and the host computer system 104 comprise a single computing device. Many other examples are possible, all of which are within the scope of the present invention.

The network 106 may be any wireless or wired network, including an optical network, a local network, an Ethernet, a local area network, a virtual private network, a wide area network, the Internet, and/or the like, or any combination of the foregoing. Many other examples are possible.

The data management system 100 also may include one or more computing devices 114 that provide user access to the various components of the data management system 100. The computing devices 114 may be work stations, desktop computers, laptop computers, personal digital computers, terminals, and the like. The computing devices 114 may access the various components of the data management system 100 via the network 106, or the computing devices 114 may be connected directly to any one or more of the components.

The host computer system 104, the data environments 102, and the computing devices 114 each may include application software that programs the device to perform the methods of the present invention. For example, the server computer 108 of the host computer system 104 may be programmed to create records containing TNs and the rules that describe the status of the each TN.

According to this specific, non-limiting example of the present invention, the data environment 102-1 may be a TN inventory management system. One such commercial version of a TN inventory management system is called Customer Number Manager (CNUM), a product of Telcordia Technologies, Inc. of Morristown, N.J. The TN inventory management system 102-1 may-be the primary system for a telephone company to manage its TN inventory, although other data environments also may affect a TN's status.

As stated previously, the number pooling mandate requires management of TNs according to FCC-defined categories relating to status. Because the FCC-mandated categories do not relate to categories typically used by telephone service providers, present TN inventory management systems, such as the CNUM system 102-1 of FIG. 1A, cannot easily generate the reports needed to satisfy the number pooling mandate. Such operational support systems were simply not designed for reporting. Further, information from other data environments 102 that may affect a TN's status must be included to properly report on TN inventory.

A second data environment that may affect a TN's status according to the FCC-defined categories is a porting management system 102-2. "Porting" refers to Local Number Portability (LNP) the process for reassigning a TN from one central office switch to another, possibly through a series of switches. Porting often occurs when a customer relocates to a new home or business still within their telephone service provider's service area. If the customer wishes to keep his old telephone number at his new location, the number must be "ported" to the new location if the telephone switch that serves the customer's new location is different from the one serving his previous location. When a call is placed to a ported TN, instead of being routed to the switch to which the TN was allocated originally, a porting assignment ensures that the call is routed to the proper location.

A porting management system 102-2 creates and administers port requests. One specific example of such a system is the Advanced Service Management System (ASMS). The porting management system 102-2 also may activate port requests and interface with internal organizations relating to porting administration. Whether a TN is ported and to where it is ported may affect to which of the FCC-defined status categories a TN belongs. It may also be the case, however, that, irrespective of the number-pooling mandate, a telephone service provider wishes to relate information on ported TNs with other TN information maintained in other data environments. Therefore, this specific example of the present invention includes the porting management system 102-2.

This specific example of the present invention also includes one or more service order systems 102-3. The service order system 102-3 collects service orders and service order-related data from one or more service order processing systems and retains the information for a period of time. As with the previously-described data environments, information in the service order system 102-3 may affect a TN's status, or may need to be related to TN information maintained in other data environments 102 with respect to the number pooling mandate.

The TN management system 100 also includes a central office information system 102-4. One example of such as system is known as SWITCH. The central office (CO) information system 102-4 stores information associated with central office facilities and circuits. It provides inventory and flow-through assignment to support line- and trunk-side CO provisioning of digital, analog, and packet switching facilities. The CO information system 102-4 may include TN status data, and is, therefore, included in the TN management system 100.

The TN management system 100 also may include a provisioning system 102-5. The provisioning system programs the telephone network according to customer orders. The TN management system 100 also may include a customer record database 102-6, which stores information relating to customer accounts, and/or a repair database 102-7, which maintains records of customer repair orders. Other data environments also may be included.

Figure 2:
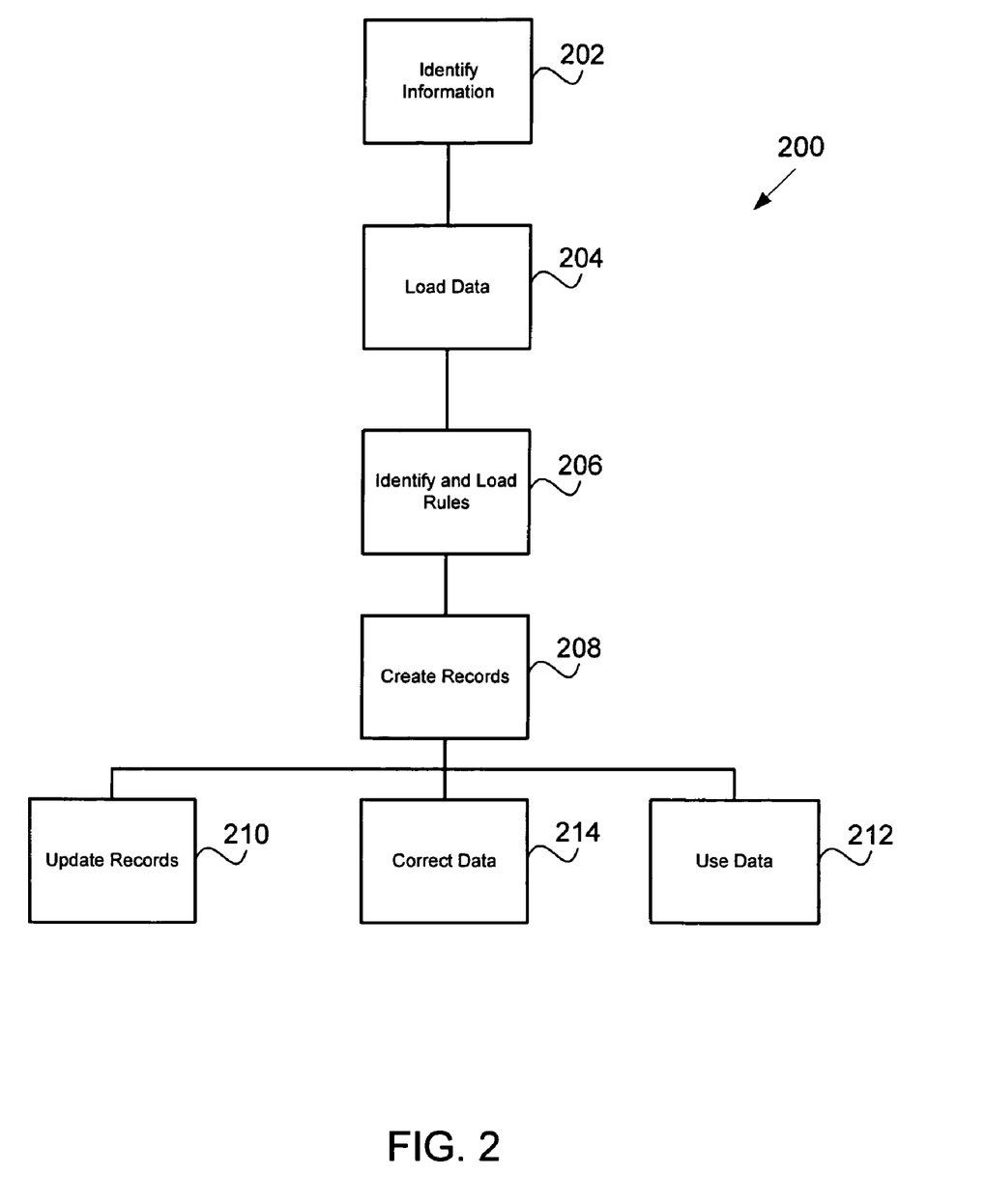
FIG. 2 illustrates a method of managing data in a data management system, such as the system of FIG. 1A.

Having described an example of a system according to the present invention, attention is directed to FIG. 2, which illustrates an example of a method 200 according to the present invention. The method 200 may be implemented in the data management system of FIG. 1A. The method 200 relates to TN inventory management by way of example. As with the TN management system 100 described with respect to FIG. 1A, however, the method 200 should not be considered limited to a TN inventory management method.

Figure 1B:
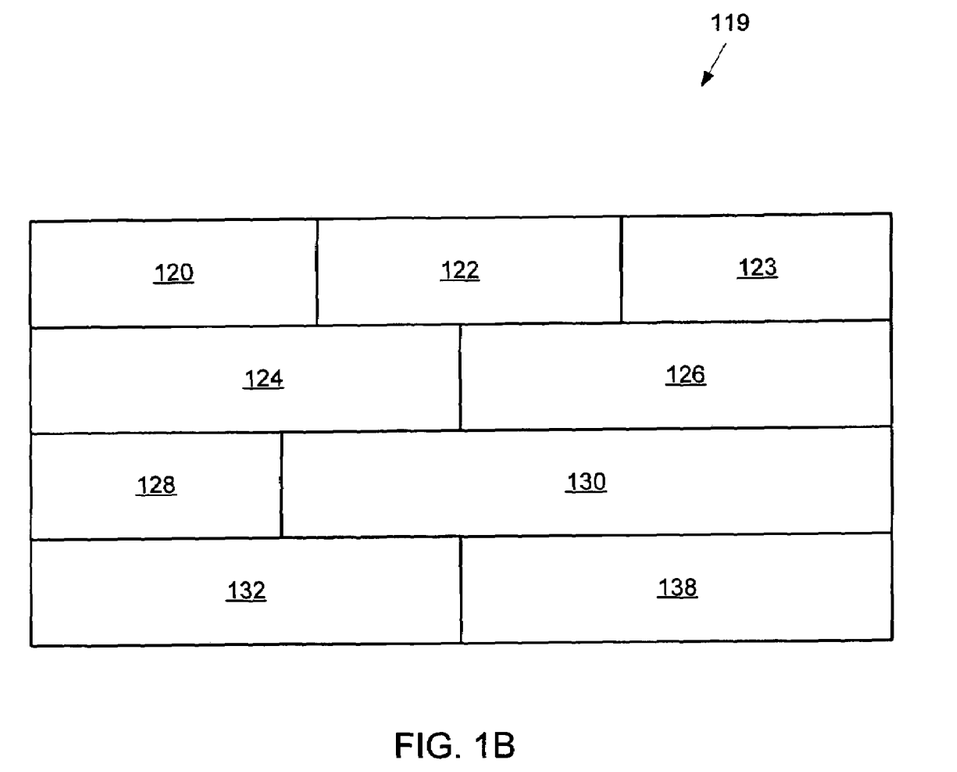

According to the method 200, at operation 202 information of interest relating to items in a data management system is identified. The information of interest may be expressed as a variable having a number of possible values. In this case, the items are TNs and the information of interest is each TN's status. Also at this operation, a data representation for the records that will store the data is designed. The specific design format may depend on the particular software used to operate the system. For example, the present invention may be designed in any of several well known commercial database or spreadsheet programs. In one specific embodiment, the method is carried out using Oracle database software; however, other programs also may be used, including Microsoft Access, DB2, and Microsoft Excel. It also may be the case that the present invention is embodied in a custom software program. Many other examples are possible, as is evident to those of skill in the art. In some embodiments of the present invention, the records comprise data tables 119 having fields for each TN 120, the variable that describes a TN's status 122, a start date for the data 123, an end date for the data 124, the switch containing the TN 128, the name and address of the customer to whom the TN is assigned 130, the TN's usage 132, and the like, all as illustrated in FIG. 1B. It also may be the case that a different data representation is used for each of several data environments.

At operation 204, data is loaded from each of a plurality of data environments into a data management system. In this example of the present invention, the data is loaded from the data environments 102 of FIG. 1 into the host computer system 104. The data will include the items, as well as the information of interest. In this case, each TN is loaded, along with the information necessary to determine each TN's status, among other things.

It may be the case that special mapping and translation of data is required to accomplish operation 204. For example, if different data environments operate according to different data standards or include different data formatting, it may be necessary to "map" the data into a new format. This may be necessary for other reasons as well. In some embodiments, the data mapping is accomplished at a different point in the process, as will be described. It may also be the case that the information of interest must be derived from other data stored in the data environment. Thus, operation 204 also may include deriving a TN's status in this specific example.

Figure 1C:
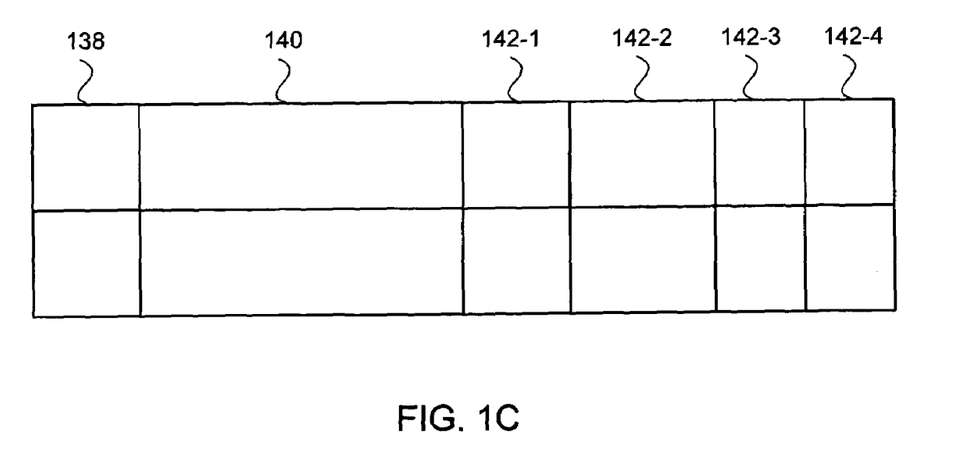

At operation 206, rules 138 are identified and loaded. The rules comprise all possible combinations of TN 140 statuses, which may have a range of possible values in each of the data environments 142, all as illustrated in FIG. 1C. The rules load process may be accomplished by, for example, listing the rules on a spreadsheet and loading the spreadsheet as data. In this way, the rules may be modified, as necessary, if data environments are added or the information of interest changes. Further, multiple rules sets may be used simultaneously, each operating on different information of interest. In such cases, compound searches of the data may be carried out efficiently.

At operation 208, the rule relating to the information of interest is determined, and a record is created for each item. In this case, a record is opened for selected TNs, and the applicable rule having the particular combination of statuses for the TN is included in the record. At this operation, if not accomplished previously, the data from the various data environments may require mapping into the common format. Also at this operation, a start date for the opening of the record may be determined and written into the record. Other data also may be written into the records at operation 208. The records are then stored for further uses.

It should be noted at this point that the order in which operations or sub-operations are performed is not necessarily important. For example, the saving of records may take place immediately after each record is created, or after the creation of any number of records. It is to be understood, therefore, that the present invention includes within its scope the carrying out of the operations and sub-operations according to the present invention in orders other than in this example. Further, other examples of the present invention may include additional operations or not include some of the operations described herein. Thus, the scope of the present invention should be determined according to the claims that follow this description.

The method of the present invention may continue at operation 210 or at operation 212. At operation 210, the records are updated. The updating process includes loading from one or more of the data environments any data that has changed. If necessary, the data may be mapped at this point or at a future point, as previously described with respect to operations 204 and 208. If the data has not changed, the record remains open. If the data has changed, then the record is closed, noting the end date for the previous data, and a new record is opened with the new data and new start date. Each record is saved for future use.

The updating process of operation 210 also includes purging old records, if desirable. To increase the efficiency of accessing data, older data may be deleted, archived, or otherwise removed from the data management system. For example, in some embodiments, records having an end date older than five years may be deleted. In some embodiments, only open records are maintained. In still other embodiments, the records are maintained indefinitely. Many examples are possible. It also may be the case that older records are merely removed to a secondary storage area. The data management system may be configured to search different storage locations in a hierarchy such that data most likely to be needed is stored in a primary location that is searched first, while data less likely to be needed is stored in secondary locations. Many other examples are possible and apparent to those of skill in the art in light of this disclosure.

At operation 212, the stored records may be used for a variety of useful purposes, several of which will be described in more detail below. For example, in the case of the TN inventory management system, the information may be used to report TN status to NANPA according to the number-pooling mandate.

The method of the present invention also may continue at operation 214. At operation 214, "data drift" may be corrected periodically. In some embodiments of the present invention, operation 214 may not be necessary. In the example of a TN inventory management system described thus far, however, operation 214 typically is necessary.

Because of the way data is loaded from the various data environments and updated periodically, records may be created and never closed. For instance, in a porting management system, such as the porting management system 102-2 described above with respect to FIG. 1A, data may not be maintained on non-ported TNs. That is, the system may only store information relating to ported TNs. If a previously-ported TN becomes no longer ported, if, for example; the customer cancels service, then the porting management system no longer stores data relating to the TN. During the updating process, in the absence of data relating to a TN, the rule applicable to a TN does not change. Therefore, TNs may continue to appear to be ported in the data management system even though they are not. Conversely, it may be the case that a customer cancels service of a ported TN, but the porting assignment is never cleared. The TN is available for use by another customer, but the presence of a porting assignment causes the TN to appear in use. Further, data may be incorrectly entered into one of the data environments, resulting in bad data being read into the data management system. Further still, data may be updated in a data environment without resetting a "last edited" or similar field that would alert the data management system of the need to load the changed data. Many other events may result in the presence of bad data in either the source data environment of the data management system. Thus, a periodic updating of the data environments with information from the data management system at operation 214 may resolve these and other data drift issues.

Figure 3A:
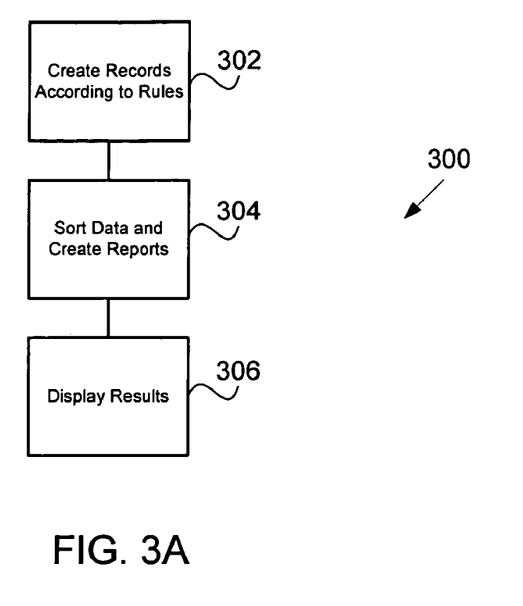
FIGS. 3A-D illustrate data management methods according to embodiments of the present invention.

Attention is directed to FIG. 3A, which illustrates a first example of a use to which the present invention may be applied. The use is embodied in a method 300 that may be a continuation of the method 200 of FIG. 2. For example, the method 300 may proceed at operation 212 of FIG. 2. In fact, this is the case with each of the examples described below with respect to FIGS. 3A-3D. The method 300 relates to reporting TN status information.

TN status information may be reported to any entity authorized to receive the information. The reports may be made available via a network, such as the Internet, wherein the information may be displayed on monitors associated with computers connected to the network. In another example, the information may be printed and submitted as a report to a requesting agency such as NANPA. Many other examples are possible.

The method 300 begins at operation 302 wherein items and information of interest are read into a data management system, associated with rules, and stored into records according to the examples previously discussed. In this example of a method of reporting TN status information, the items are TNs and the information of interest is each TN's status in each of a plurality of data environments. The detailed steps for completing this operation were described previously with respect to FIG. 2.

At operation 304, the data is sorted, organized, and/or evaluated to produce one or more meaningful reports. For example, the number of TNs in each of several status categories defined by the FCC may be determined. This may be accomplished, for example, by identifying the rules that apply to each category and counting the number of TNs that relate to each rule. In another example, the evaluation of the data may require evaluating time periods during which particular rules relate to TNs. Many other examples are possible.

Operation 304 also may include sorting the number of TNs by the switch at which each TN is located. The number of TNs may be further sorted according to number plan area, state, and/or geographic location. Further still, the TNs may be sorted according to thousand-number block to facilitate making the numbers available to a number pool according to the FCC's number pooling mandate. Other examples are possible.

At operation 306, the data is presented to a user. The data may be presented as a printed report or may be presented on, for example, a computer monitor. The report presentation may take many forms. In one specific example, the report is interactive and includes hyperlinks that allow the user to drill down into more detailed information or otherwise navigate through the data. One example of such an interactive report is described in greater detail with respect to FIGS. 5A and 5B.

It may be the case in some examples of the present invention that operations 304 and 306 in effect merge into a single operation or continuously iterate back and forth. This may be true especially with respect to an interactive report presented on a display screen. For example, in the case of a display screen having hyperlinks that allow easy navigation through the data, each time the user follows a hyperlink, the hyperlink may execute another query of the records to obtain the information needed to present the data at the new display screen to which the hyperlink points. Those skilled in the art will recognize, in light of this disclosure, how the data management system of the present invention may function as a "backend" providing information to a user interface in the form of an interactive web site. The data requested by the user with each selection of a hyperlink is pulled from the backend database and presented according to the programming of the web page that functions as the user interface. Only through a data management system such as the present invention, however, are very large data environments able to be reduced to an interactive environment in which detailed information is quickly displayed. Heretofore, queries to display information such as that provided by the present invention took far too long to exist practically in an interactive environment.

Figure 3B:
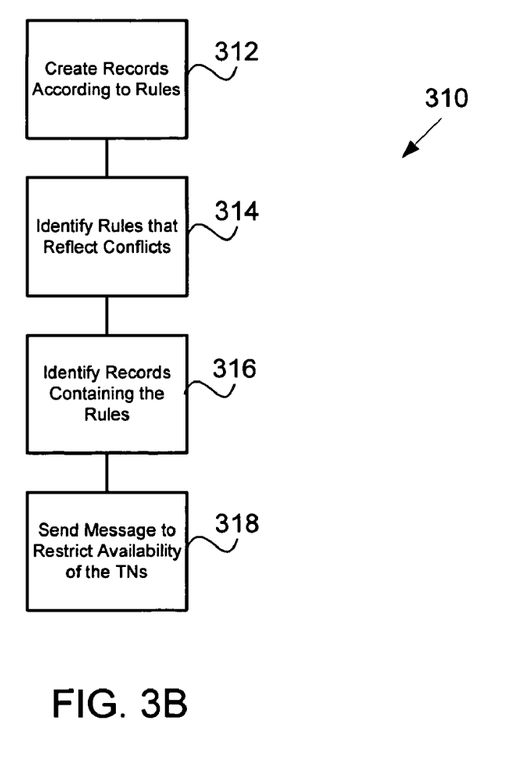

Attention is now directed to FIG. 3B which illustrates a second method 310 that demonstrates another use to which the present invention may be applied. The method 310 relates to restricting a TN's availability for assignment if a problem is discovered relating to the TN's status. This may occur, for example, when different data environments conflict as to a TN's status.

If a TN's status is different in two or more data environments, significant problems may result. One of the most significant problems occurs when a new customer is assigned a TN that is in use by an existing customer. At the very least, such conditions create additional expense, especially in telephone service provider provisioning systems. Ideally, service providers are able to provision customers' services automatically. If a conflict occurs, such as a TN assigned to two customers simultaneously, then a service order cannot be completed automatically. Any successful effort to identify such problems in advance greatly increases the efficiency with which the service provider operates. The method 310 is one such example.

The method 310 begins at operation 312 at which point data is entered into a data management system. This operation is similar to the operation 302 of the method 300. At operation 314, one or more rules are identified that reflect a status conflict among a plurality of data environments. A status conflict might exist, for example, when a porting data environment lists a TN as ported, while an inventory information system lists the TN as available. Thus, any rule that includes these two status possibilities may reflect a conflict.

At operation 316, the records are searched for any TN relating to the rules identified in operation 314. If any are discovered, at operation 318 a message is sent to one or more of the data environments to restrict the availability of the TN. The restricted availability may remain in place until the conflict is resolved, as will be explained in a few specific examples hereinafter.

The process of identifying TNs and sending the restrict availability message may occur in a number of different ways. For example, when a rule is known to reflect a conflict, any TN having the status may result in a message being generated during the record creation or update process. In another example, when a rule is newly-found to reflect a conflict, then a review of open records may generate messages for TNs relating to the rule. In yet another example, a specific request for information relating to a specific TN may generate a message if the TN relates to a known conflict rule. Many other examples are possible.

Figure 3C:
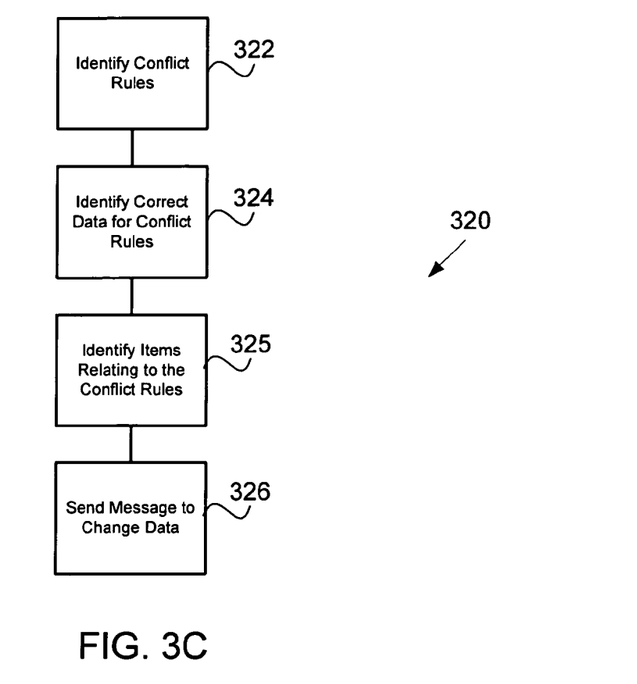
Figure 3D:
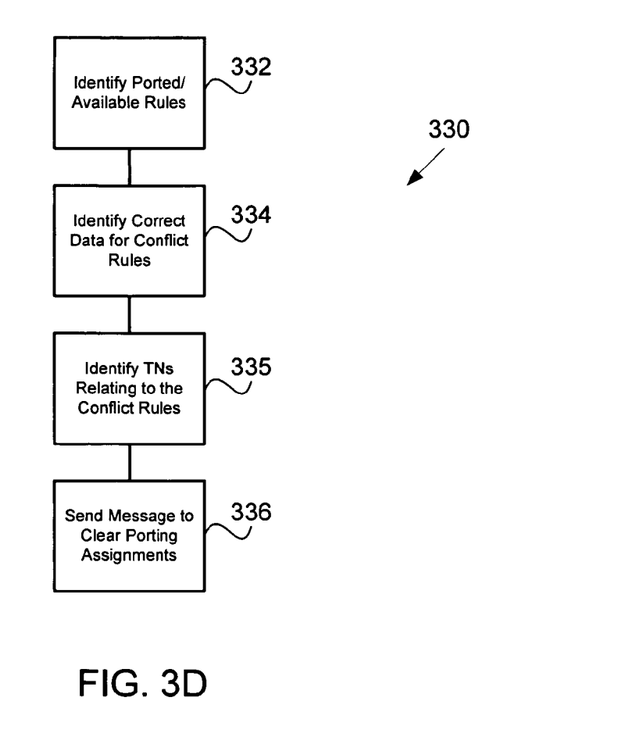

FIG. 3C illustrates a method 320 of resolving discrepancies among a plurality of data environments. In this example once again, the benefits of a rules-based data management system are evident. In very large data environments, identifying and resolving discrepancies for individual items is time consuming and inefficient. However, once a rule is known to evidence a conflict, the conflict may be resolved, in many situations, simultaneously for all items that relate to the rule. The method begins at operation 322 by identifying a rule that reflects a conflict among two or more data environments. At operation 324, it is determined what the correct data should be in one of the data environments for items that relate to the rule. At operation 325, all items relating to the rule are identified. At operation 326, a message is sent to one of the data environments to write new data for each of the items that relate to the rule. FIG. 3D illustrates a more specific example relating to a TN inventory management system.

FIG. 3D illustrates a method 330 of clearing incorrect porting assignments. As explained previously, a TN may be ported from an original switch to a new switch when, for example, a customer relocates and wishes to keep his same TN. When a call is placed to the customer's number, a porting management system (such as system 102-2 of FIG. 1A), provides information that directs the call to the proper switch. Eventually, the customer may cancel his telephone service. It has been reported that porting assignments are not necessarily cleared when this occurs. Thus, a TN may have a status of "ported" in a porting management system, and a status of "available" in a TN inventory system. This combination reflects a conflict because available TNs should not be ported. The method 330 may be employed to correct such conflicts.

The method 330 begins at operation 332 when any rules are identified that reflect a status of "ported" in a porting management system and a status of "available" in a TN inventory system. At operation 334, it is determined that the TN inventory system status should override the porting management system status. At operation 335, all TNs relating to the rule are identified. At operation 336, a message is sent to the porting management system to restore all TNs identified in operation 335 to a non-ported status. This is but one example of a method of resolving data conflicts in large groups in rules-based data management systems.

Figure 4A:
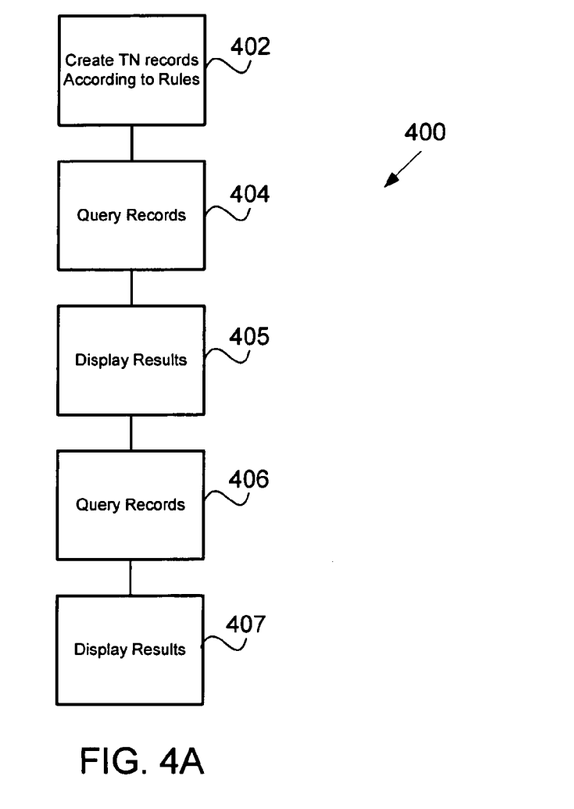
FIGS. 4A and 4B illustrate methods for performing queries on data managed according to embodiments of the present invention.
Figure 4B:
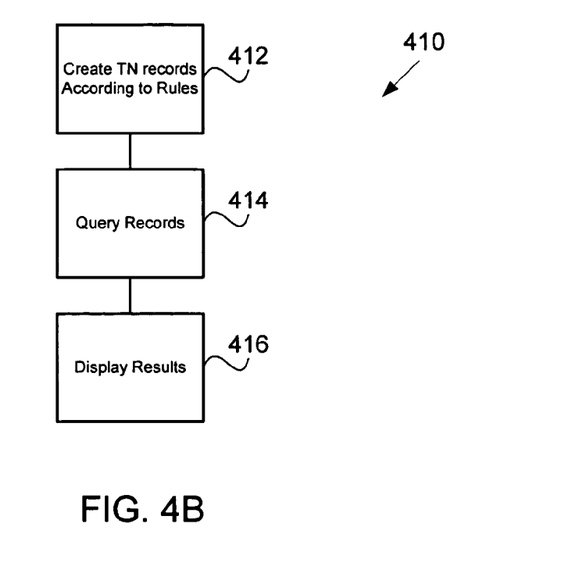

Attention is now directed to FIGS. 4A and B, which illustrate useful purposes to which a TN inventory management system according to the present invention may be applied. FIG. 4A illustrates a method of identifying "stolen" TNs according to the present invention. Telephone service providers, especially those that receive TNs from NANPA in large blocks, may encounter customers who initiate service, receive a TN, then transfer service within a short period of time to a different telephone service provider. This situation is harmful to the service provider in at least two ways. First, the service provider loses a TN from its inventory. Second, the service provider incurs the expense of setting up a new customer but does not receive the long-term payback of customer longevity. There is an explanation for this occurrence, and a potential solution provided by the present invention.

When a service provider receives a large block of TNs from NANPA, it is very likely that the block includes specific numbers that customers desire. For example, business customers want easy-to-remember TNs, that contain, for example, repeating numbers, number sequences, or numbers whose related letters on a telephone keypad spell a word, phrase, or especially a trademark (i.e., vanity numbers). In order to receive a specific TN, however, the customer must, at least initially, be a customer of the telephone service provider to whom the TN was distributed. Thus, it is sometimes the case that a customer will initiate service with one service provider for the sole purpose of obtaining a TN from the service provider's inventory. The method 400 of FIG. 4A helps a service provider to identify such instances and police its TN inventory.

The method 400 begins at operation 402, wherein TN inventory data is managed in a TN inventory management system according to the present invention. In this operation 402, it may be helpful to the present method to include in the records for each TN a few additional data fields. For example, a cancelled_service field may be used to identify whether a customer has cancelled service. A service_initiation field may be used to identify the date a customer begins service with the service provider. A date_cancelled_service field might be used to identify the date a customer cancels service. A new_provider field might be used to identify a telephone service provider to whom a customer transfers his TN and service.

At operation 404, the records are queried to identify any customers who cancelled service within a specific number of months, for example two months, from the initiation of service. At operation 405, the information is displayed to a user. At operation 406, the records also may be queried to determine to which service providers the customers transferred service. At operation 407, this information is displayed to a user.

The method 400 illustrates yet another benefit of a rules-based data management system. For very large data environments, a rules-based system makes it much easier to maintain historical data relating to the items. Maintaining the information without the use of rules presents a problem when it comes to searching for the type of information provided by the method 400.

FIG. 4B illustrates another example method 410 of a use to which a rules-based TN inventory management system may be applied. The method 410 provides a report of recently-canceled TNs. "Recently-canceled" may be any user-defined period of time. In a very specific embodiment, the period of time is six months. This is very useful to service providers that administer a no-call list for TNs owned by customers that do not wish to be called by solicitors. In some states, Colorado, for example, consumers may have their TN placed on a no-call list. The list is published every three months, and telephone solicitors may be fined for placing calls to numbers on the list. If a customer on the no call list cancels service, however, there is no mechanism for removing the TN from the no call list. The method 410 provides one solution to this problem.

According to the method 410, TNs are managed in a TN inventory management system, according to the present invention, at operation 412. It may be helpful, although not necessary, to include a no_call_list data field in the records pertaining to the TNs. At operation 414, the records are queried to determine any no call list customers who cancelled service within the previous three months. At operation 416, this information is displayed to a user. The information then may be used to remove the TNs from the no call list.

The methods of FIGS. 4A and 4B are but two examples to which the TN inventory management system of the present invention may be applied. Many other examples are possible and are apparent to those skilled in the art.

Figure 5B:
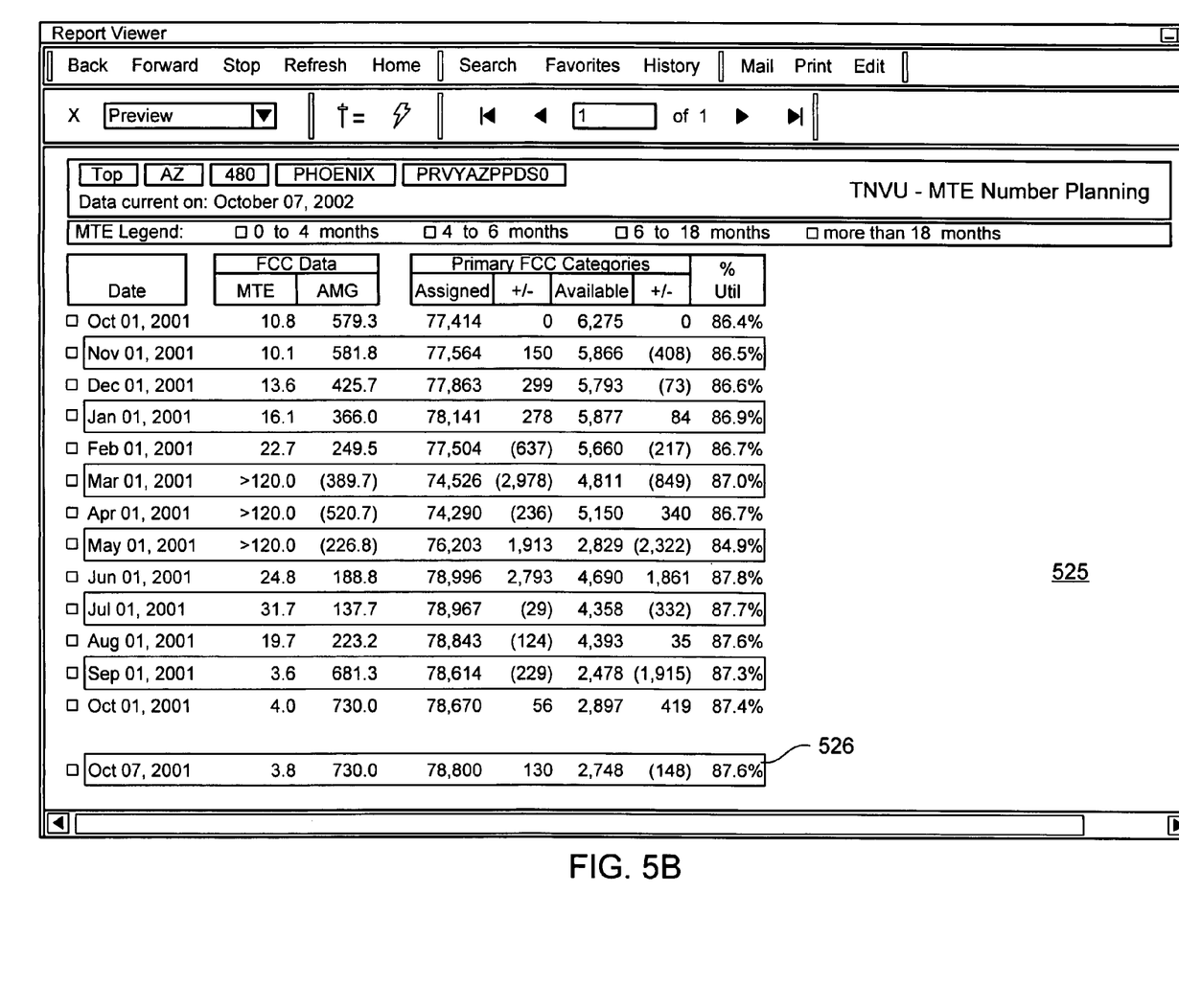

Attention is now directed to FIGS. 5A and 5B, which illustrate examples of display screens that may be used to visually represent information according to the present invention. The exemplary display screens of FIGS. 5A and 5B relate to a TN inventory management system such as the one previously described. This embodiment of the present invention should not be considered limited to a TN inventory management system. FIG. 5A illustrates a display screen 500 that provides information on the rate of usage of TNs in a TN management system. This display screen 500, as well as others described herein, may be accessible via the Internet or other network, as is known in the art. For example, a customer service representative working at a location other than a location that houses any portion of the TN inventory management system may use a web browser to access this display screen. Security features may be employed to limit access by persons not authorized to view the information or to limit the information each person may access. In another example, the display screens may be used by a telephone service provider to report TN inventory reports to NANPA in compliance with the number pooling mandate. Many other exemplary uses of the display screen 500 are possible and apparent to those of skill in the art in light of this description.

The display screen 500 includes a first tool bar 502 that may be specific to a web browser used to access the display screen 500. The display screen 500 also includes a second tool bar 504 that may be customized to the particular information being displayed. Buttons on the second tool bar 504 may provide navigation functions through a series of pages, a find feature, and the like.

The display screen 500 also includes a series of location buttons 506 that provide the user with information relating to the user's location within a data hierarchy. For instance, in the present example relating to TN inventory management, TNs may be arranged into groups starting with the highest level, "Top," that may include, for example, all TNs, all TNs within the telephone service provider's inventory, or all TNs within the telephone service provider's inventory in a given state, in this case, the fictitious state of Abalone (AB). The next level down from the state level might be the area code level (i.e., NPA), in this case, 123. Below the area code level might be the rate center level, in this case, Riverdale. The next level below the rate center level might be the switch level. Thus, the information being displayed in the display screen 500, according to the location buttons 506, is a list of switches in the Riverdale rate center in the 123 area code in Abalone. The location buttons 506 may act as hyperlinks to allow the user to navigate up to higher data levels in the hierarchy, and indicators 508, next to each line of data, might allow the user to drill down to the next lower data level in the hierarchy to obtain more detailed information. Alternatively, the drill-down function may be provided by the entry in the rate center column.

Each line of data in the display screen 500 of FIG. 5A provides information on TN inventory for a given switch. For example, line 510, the last line, provides information on TN inventory in switch BNYYABPPDSO in the Riverdale rate center in Abalone. The information includes: months to exhaustion (MTE) 511, average monthly growth (AMG) 512, the number of TNs assigned to the switch 513, the change from the previous month 514, the number of TNs available for assignment 515, the change from the previous month 516, the % utilization of TNs in the switch 517, the number of NPA-NXXs served by the switch 518, and the number of 1K TN blocks received 519 and donated 520. Each of these metrics will be described in more detail below.

The indicators 508 in front of each line of data may also provide an easy indicator of the status of each switch's inventory through color coding. The legend 522 provides the key to the color coding. Selecting the indicator 508 next to the line 510 would cause the display screen 525 of FIG. 5B to be displayed.

FIG. 5B illustrates a more detailed, historical representation of the activity with respect to TN inventory at a specific switch. The historical perspective illustrates how the TN inventory at a switch has changed over time. This view also facilitates efforts to plan for seasonal fluctuations in the number of TNs available at a switch. The location buttons 506 provide the user with a visual representation of the user's location within the data hierarchy, as previously discussed. In this display screen 525, however, each line of data represents a month in the life of the switch, with the exception of the last line 526, which represents the present status of the switch. The data columns in each line of display screen 525 are the same as the analogous column from the display screen 500.

Referring now to both FIGS. 5A and 5B, the "available" column 515 lists the number of TNs available for assignment in the switch. The "assigned" column 513 lists the number of TNs in the switch that are assigned. In the case of the display screen 500 of FIG. 5A, each entry in the Assigned column 513 relates to a different switch, while the entries in the Assigned column 513 of display screen 525 of FIG. 5B relate to different periods of time for a particular switch.

The data to determine which TNs are assigned and which TNs are available may come from a query of the TN inventory management system discussed previously. For example, a data field in each record of the TN inventory management system may identify the switch to which each TN belongs. Other data field may identify whether the TN is assigned or available. It should be noted that the definitions of "available" and "assigned" may be selected such that they match the definitions of "available" and "assigned" according to the FCC with respect to the number pooling mandate. It also may be the case that a TN should be considered available or assigned according to the FCC definition if the TN fell into that category at any time during a previous period of time, such as six month or two years. Thus, the entire collection of records may be evaluated to total the number of assigned and available numbers in each switch according to the definitions.

Continuing to refer to FIGS. 5A and B, the Assigned +/- column 514 and the available +/- column 516 list the change in the number of TNs assigned or available, respectively, from the previous month. Of course, other reports could be designed that track the changes over different time periods such as quarters of a year or years. The % Util column 517 lists the percentage of TNs located at the switch that are utilized according to the FCC definition.

The AMG column 512 lists the average monthly growth in assigned TNs over the preceding six months as defined by the FCC. Other averaging time periods could be used. The MTE column 511 lists the number of months until the available TNs located at a switch run out at the current AMG. It is calculated by dividing the number of TNs available by the AMG.

Thus, the information provided by FIGS. 5A and 5B provide telephone service providers easily understandable reports on TN inventory at multiple levels. The indicators 508 provide a visual indication of whether any switches are running out of numbers. By being able to forecast TN utilization, these service providers are better able to service customers by better managing the supply of TNs, thereby reducing the possibility that a customer desiring service will have to wait for a TN to become available. Further, the information helps the service providers to comply with FCC requirements such as the number pooling mandate. For example, if the utilization of TNs at a given rate center falls below a pre-established threshold, then the service provider may be asked by the FCC to release TNs in blocks of 1,000 to the number pool. In this way, the finite supply of TNs may be extended.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Additionally, those skilled in the art will realize that the present invention is not limited to managing TN inventory. The teachings of the present invention may be used to manage data in other data environments. Accordingly, the above description should not be taken as limiting the scope of the invention, which is defined in the following claims.

What is claimed is:

1. A computer-implemented method of correcting telephone number status discrepancies using a telephone number inventory management system, the method comprising:

providing a computer-based telephone number inventory management system;

in the system, storing a list of rules, wherein each rule in the list of rules represents a unique combination of variables, each variable representing a status possibility for a telephone number in one of a plurality of data environments;

receiving data from each of the plurality of data environments, wherein the data is indicative of a status of one or more telephone numbers in the data environment;

for each of a plurality of telephone numbers, using the data from each of the plurality of data environments to select a rule from the list of rules, wherein the selected rule identifies the status of the telephone number in each of the plurality of data environments;

for each telephone number, storing the telephone number and the selected rule in a record;

from the list of rules, identifying a specific rule that reflects a discrepancy between a status possibility for a telephone number in one data environment and a status possibility for a telephone number in another data environment;

electronically searching the records to identify telephone numbers stored in a record with the specific rule;

transmitting from the telephone number inventory management system a command to one of the plurality of data environments to change the status of each of the telephone numbers relating to the specific rule; and thereafter, on a display associated with the computer-based telephone number inventory management system, displaying information relating to a changed status.

2. The method of claim 1, wherein one of the data environments relates to a telephone number inventory system.

3. The method of claim 2, wherein the telephone number inventory system comprises a Customer Number Manager product.

4. The method of claim 1, wherein one of the data environments relates to a telephone number porting management system.

5. The method of claim 4, wherein the telephone number porting management comprises an Advanced Service Management System.

6. The method of claim 1, wherein one of the data environments relates to a service order system.

7. The method of claim 1, wherein one of the data environments relates to a system that manages data relating to central office facilities and circuits.

8. A system for correcting telephone number status discrepancies, comprising:

a host computer system programmed to:

receive a list of rules, each rule in the list of rules represents a unique combination of variables, each variable representing a status possibility for a telephone number in one of a plurality of data environments;

store the list of rules;

receive data from each of the plurality of data environments, wherein the data is indicative of a status of one or more telephone numbers in the data environment;

for each of a plurality of telephone numbers, use the data from each of the plurality of data environments to select a rule from the list of rules, wherein the selected rule identifies the status of the telephone number in each of the plurality of data environments;

for each telephone number, store the telephone number and the selected rule in a record;

receive information identifying a specific rule that reflects a discrepancy between a status possibility for a telephone number in one data environment and a status possibility for a telephone number in another data environment;

search the records for telephone numbers relating to the specific rule; and transmit a command to one of the plurality of data environments to change the status of each of the telephone numbers relating to the specific rule.

9. The system of claim 8, wherein one of the data environments relates to a telephone number inventory system.

10. The system of claim 9, wherein the telephone number inventory system comprises a Customer Number Manager product.

11. The system of claim 8, wherein one of the data environments relates to a telephone number porting management system.

12. The system of claim 11, wherein the telephone number porting management system comprises an Advanced Service Management System.

13. The system of claim 8, wherein one of the data environments relates to a service order system.

14. The system of claim 8, wherein one of the data environments relates to a system that manages data relating to central office facilities and circuits.

15. A telephone number inventory management system, comprising:

means for storing a list of rules, wherein each rule in the list of rules represents a unique combination of variables, each variable representing a status possibility for a telephone number in one of a plurality of data environments;

means for receiving data from each of the plurality of data environments, wherein the data is indicative of a status of one or more telephone numbers in the data environment;

means for using the data from each of the plurality of data environments to select a rule from the list of rules for each of a plurality of telephone numbers, wherein the selected rule identifies the status of the telephone number in each of the plurality of data environments;

means for storing each telephone number and its associated selected rule in a record;

receiving means for receiving information identifying a specific rule that reflects a discrepancy between a status possibility for a telephone number in one data environment and a status possibility for a telephone number in another data environment;

searching means for searching the records for telephone numbers relating to the specific rule; and transmitting means for transmitting a command to one of the plurality of data environments to change the status of each of the telephone numbers relating to the specific rule.

16. The system of claim 15, wherein one of the data environments relates to a telephone number inventory system.

17. The system of claim 16, wherein the telephone number inventory system comprises a Customer Number Manager product.

18. The system of claim 15, wherein one of the data environments relates to a telephone number porting management system.

19. The system of claim 18, wherein the telephone number porting management system comprises an Advanced Service Management System.

20. The system of claim 19, wherein one of the data environments relates to a service order system.

21. The method of claim 1, wherein:
the plurality of data environments comprises a first data environment and a second data environment;
a first telephone number has a status of being a residential customer phone number on the first data environment;
the first telephone number has a status of being a business customer hone number on the second data environment;
the list of rules comprises a first rule, wherein the first rule represents:
the status of residential customer phone number on the first data environment; and
the status of business customer phone number on the second data environment; and
storing the telephone number and the selected rule in a record comprises storing the first telephone number and the first rule in the record.

22. The method of claim 1, wherein:
the plurality of data environments comprises a first data environment and a second data environment;
a first telephone number has a status of being a voice communication phone number on the first data environment;
the first telephone number has a status of being a data communication phone number on the second data environment;
the list of rules comprises a first rule, wherein the first rule represents:
the status of voice communication phone number on the first data environment; and
the status of data communication phone number on the second data environment; and
storing the telephone number and the selected rule in a record comprises storing the first telephone number and the first rule in the record.

23. The method of claim 1, wherein:
the plurality of data environments comprises a first data environment and a second data environment;
a first telephone number has a status of being a reserved phone number on the first data environment;
the first telephone number has a status of being an unreserved phone number on the second data environment;
the list of rules comprises a first rule, wherein the first rule represents:
the status of reserved phone number on the first data environment; and
the status of unreserved phone number on the second data environment; and storing the telephone number and the selected rule in a record comprises storing the first telephone number and the first rule in the record.

24. The method of claim 1, wherein:
the plurality of data environments comprises a first data environment and a second data environment;
a first telephone number has a status of being an available phone number on the first data environment;
the first telephone number has a status of being an unavailable phone number on the second data environment; and
the list of rules comprises a first rule, wherein the first rule represents:
the status of available number on the first data environment; and
the status of unavailable phone number on the second data environment; and
storing the telephone number and the selected rule in a record comprises storing the first telephone number and the first rule in the record.

* * * * *